(12) United States Patent
Takatani

(10) Patent No.: US 8,213,811 B2
(45) Date of Patent: Jul. 3, 2012

(54) IMAGE FORMING APPARATUS

(75) Inventor: Masahiro Takatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 324 days.

(21) Appl. No.: 12/659,137

(22) Filed: Feb. 26, 2010

(65) Prior Publication Data

US 2010/0226662 A1 Sep. 9, 2010

(30) Foreign Application Priority Data

Mar. 3, 2009 (JP) ................................. 2009-049325

(51) Int. Cl.
*G03G 15/00* (2006.01)
*G03G 15/20* (2006.01)

(52) U.S. Cl. .................. 399/8; 399/37; 399/70; 399/88; 399/90

(58) Field of Classification Search ................ 399/8, 37, 399/70, 88–90
See application file for complete search history.

(56) References Cited

U.S. PATENT DOCUMENTS

| 7,283,262 | B2 | 10/2007 | Takeda et al. | |
| 7,474,431 | B2 | 1/2009 | Yamano et al. | |
| 2007/0247467 | A1* | 10/2007 | Kaneda | 345/531 |

FOREIGN PATENT DOCUMENTS

| JP | 2004-034488 | 2/2004 |
| JP | 2005-041214 | 2/2005 |
| JP | 2006-113947 | 4/2006 |
| JP | 2006-333214 | 12/2006 |
| JP | 2007-249381 | 9/2007 |

* cited by examiner

*Primary Examiner* — David Gray
*Assistant Examiner* — Joseph S Wong
(74) *Attorney, Agent, or Firm* — David G. Conlin; Steven M. Jansen; Edwards Wildman Palmer LLP

(57) ABSTRACT

Provided is an image forming apparatus having a network connecting portion, a control portion, and a status information storage portion. When a status request is sent from an external apparatus while the image forming apparatus is in a power-saving status, based on a condition set by a setting portion, the control portion makes a determination of whether (a) to perform supply of power to the main body of the image forming apparatus and acquire a status information to transmit it through the network portion or (b) not to perform supply of power to the main body of the image forming apparatus, but to transmit through the network portion a status information that has been stored in the status information storage portion before the status request, and performs controls based on the determination.

4 Claims, 9 Drawing Sheets

IMAGE FORMING APPARATUS

CROSS-NOTING PARAGRAPH

This non-provisional application claims priority under 35 U.S.C. §119(a) on Patent Application No. 2009-049325 filed in JAPAN on Mar. 3, 2009, the entire contents of which are hereby incorporated herein by reference.

FIELD OF THE INVENTION

The present invention relates to an image forming apparatus, more specifically, to an image forming apparatus capable of shifting from a normal power supply status to a power-saving status.

BACKGROUND OF THE INVENTION

In recent years, an image forming apparatus such as a printer or a multi-function peripheral has a mode called an energy-saving mode for shifting to a status where less power is consumed than a normal standby status. The energy-saving mode is generally realized by supplying power only to a certain part of an entire device.

Such an image forming apparatus is installed in a network environment where many information devices including a computer are connected and is required even in the energy-saving mode to restore from the energy-saving mode by supplying power to a main body when a print request or the like is received from an information device.

The request which requires an operation of the main body includes a status request (status inquiry request) of the image forming apparatus in addition to the above-described print request. In recent years, there is the case where a computer connected to a network environment uses an application called a status monitor for making such a request and monitors a status of the image forming apparatus. Such an application often requests to notify the image forming apparatus regularly of the status information so that the status of the image forming apparatus can be presented to a user at any time.

Normally, when the main body of the image forming apparatus is in a standby status, a network portion of the image forming apparatus by giving inquires to the main body of the image forming apparatus acquires the requested status information to respond.

In addition, when such a status request is received in the energy-saving mode where power is not supplied to the main body, the network portion, if not having any means, needs to supply power to the main body for restoration and acquire the status information for response whenever the status request (that is, the status inquiry) is sent. In the case where the network environment has many external apparatuses which introduced applications for making such a status request, the image forming apparatus supplies power to the main body for restoration with respect to all of the requests, which results in great difficulty in continuing the energy-saving mode.

There are various kinds of the status information concerning the image forming apparatus, including an operational status of online/offline as a system, an open/close status of a cover, a remaining quantity of sheets in a tray and a sheet size. It is needless to say that information which may change in the energy-saving mode is included.

As a technology for solving such a difficulty to continue the energy-saving mode (power-saving status), Japanese Laid-Open Patent Publication No. 2006-113947 discloses that an inquiry about a status is not made from a computer side to an image forming apparatus but a status monitor which receives status information transmitted from the image forming apparatus regularly is mounted in the computer.

Moreover, Japanese Laid-Open Patent Publication No. 2004-34488 discloses a technique for solving the difficulty to continue the power-saving status not by an application program on a computer side but by a main body of an image forming apparatus. This image forming apparatus uses a sub-CPU (Central Processing Unit), which is different from the one used in a normal operation, in a power-saving status to respond to a status request without activating the main body (main chip). In this case, a part of a status detecting sensor of a controller for a scanner part and a printing part is enabled even in the power-saving status so that a change in the status can be recognized even if the sub-CPU is in the power-saving status, and thereby, it becomes possible to transmit status information to the computer in keeping the power-saving status.

However, in the technique described in Japanese Laid-Open Patent Publication No. 2006-113947, a part of the computer in a network environment incorporates a unique application program which is not a common status monitor, and when the application program makes a status request to the image forming apparatus frequently, it is difficult for the image forming apparatus to continue the power-saving status.

Moreover, in the technique described in Japanese Laid-Open Patent Publication No. 2004-34488, standby power for operating the status detecting sensor regularly is necessary even in the power-saving status, and if the status detecting sensor is completely turned off in the power-saving status, the status information is not updated until the main chip is restored (that is, until the main body of the image forming apparatus is restored).

SUMMARY OF THE INVENTION

An object of the present invention is to provide an image forming apparatus capable of, when a network connecting portion receives a status request from an external apparatus in a power-saving status where a power supply is stopped to a main body part including a status detecting sensor, sorting whether to respond only by the network connecting portion without restoring the main body or to respond by restoring the main body.

In addition, another object of the present invention is to provide an image forming apparatus capable of, even in an environment where an external apparatus exists that makes a status request frequently, responding with status information as new as possible to the status request while continuing a power-saving status.

An object of the present invention is to provide an image forming apparatus having a network connecting portion and capable of communicating with an external apparatus through the network connecting portion, comprising: a control portion for controlling supply of power to a main body of the image forming apparatus in response to a status request from the external apparatus; a setting portion for setting a condition for determining whether or not to perform supply of power to the main body of the image forming apparatus by the control portion; a status information acquiring portion for acquiring status information of the main body of the image forming apparatus in the status where supply of power is performed to the main body of the image forming apparatus; and a status information storage portion for storing status information acquired by the status information acquiring portion, wherein when the status request is sent from the external apparatus while the image forming apparatus is in a power-saving status, based on the condition set by the setting portion, the control portion makes a determination of whether (a) to perform supply of power to the main body of the image forming apparatus and acquire the status information to transmit it through the network connecting portion or (b) not to perform supply of power to the main body of the image forming apparatus, but to transmit through the network connecting portion the status information that has been stored in the status information storage portion before the status request, and performs controls based on the determination.

It is another object of the present invention is to provide the image forming apparatus, wherein the condition set by the setting portion includes a valid period of the status information, stored in the status information storage portion, of the main body of the image forming apparatus which is before it has come into the power-saving status.

It is another object of the present invention is to provide the image forming apparatus, wherein the condition set by the setting portion includes a threshold of the number of status requests available for each external apparatus.

It is another object of the present invention is to provide The image forming apparatus, wherein the condition set by the setting portion includes a threshold of an interval between status requests from the same external apparatus.

PREFERRED EMBODIMENTS OF THE INVENTION

Although a printing device (printer) will be described as an image forming apparatus according to the present invention, the image forming apparatus may be a multi-function peripheral having not only a print function but also a copy function, an e-mail transmission function, a filing function and the like. In addition, although a computer such as a personal computer or a server computer will be described as an external apparatus connected to the image forming apparatus according to the present invention, the external apparatus may be a print server or the like. Further, the number of image forming apparatuses and external apparatuses connected to a network will not be limited to the example below.

Figure 1:
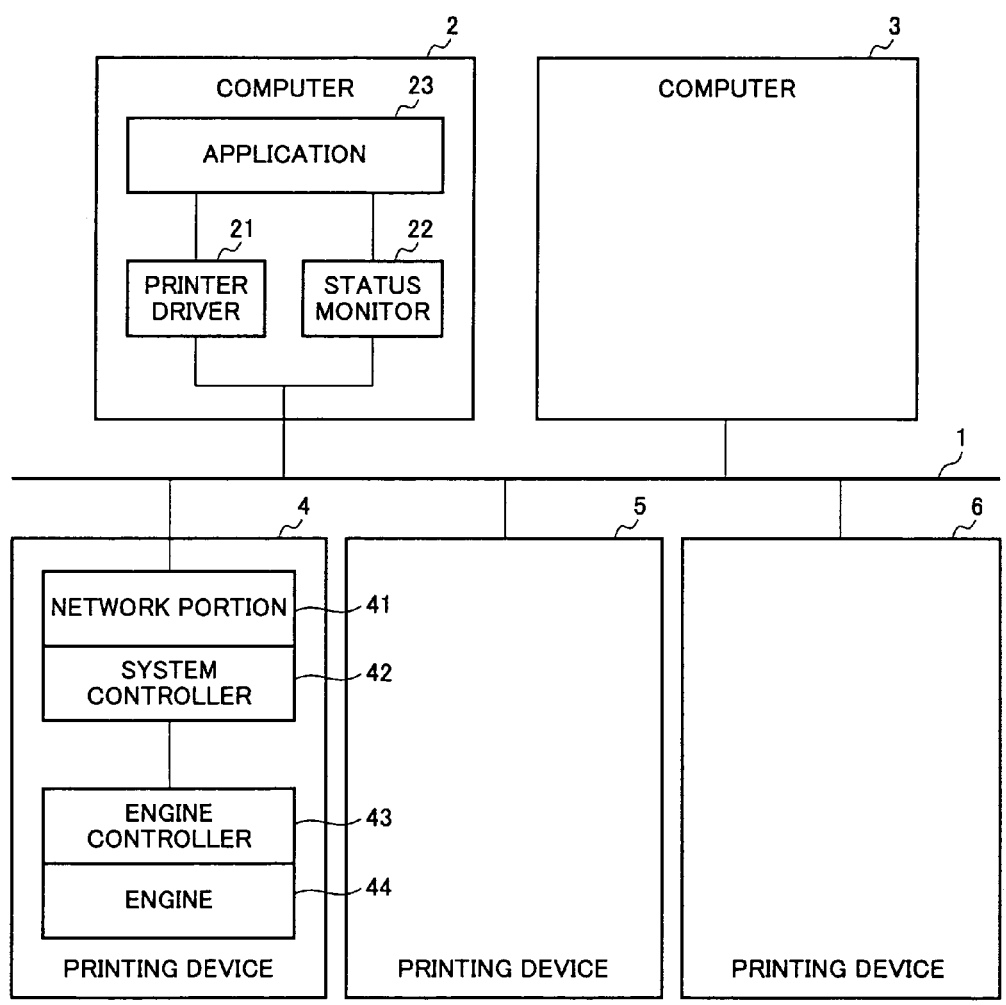
FIG. 1 is a view showing one example of a network environment including printing devices as one example of an image forming apparatus according to the present invention and computers as one example of an external apparatus connected thereto.
Figure 2:
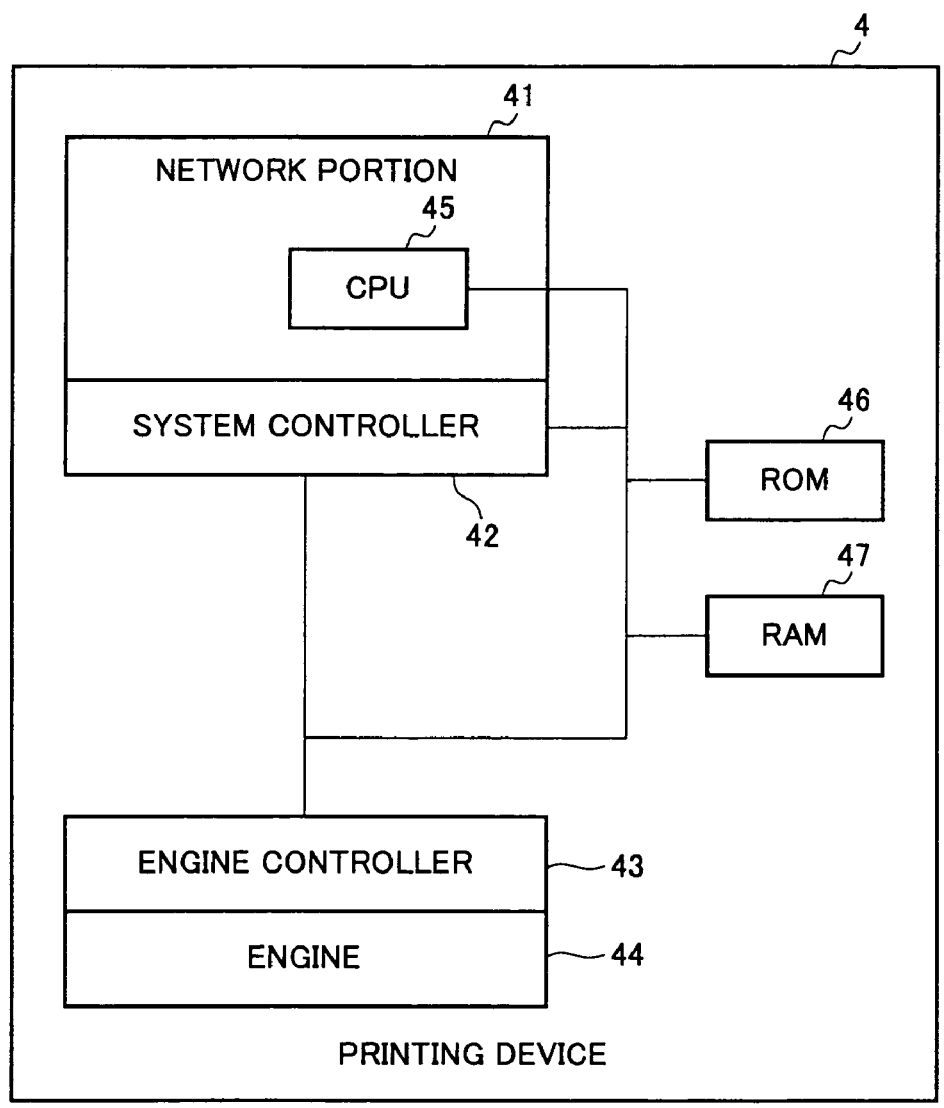
FIG. 2 is a view showing a detailed exemplary configuration of the printing device in the network environment of FIG. 1.

FIG. 1 is a view showing one example of a network environment including printing devices as one example of an image forming apparatus according to the present invention and computers as one example of an external apparatus connected thereto. In addition, FIG. 2 is a view showing a detailed exemplary configuration of the printing device in the network environment of FIG. 1.

In the network environment exemplarily illustrated in FIG. 1, a plurality of printing devices 4 to 6 and computers 2 and 3 are connected to one another in a network 1 by wire or by radio and the printing devices and the computers are able to transmit/receive data to one another through the network 1.

A printer driver 21, a status monitor 22 and an application 23 are inside the computer 2. For example, when trying to print a document created by the application 23 with the printing device 4, the printer driver 21 tries to acquire a status of the printing device 4. And, as the status monitor 22 regularly acquires all statuses of the printing devices 4 to 6, for example, it is possible to present information for selecting which printing device is used to a user.

Note that, the computer 3 is basically the same as the computer 2 in a configuration and only capable of acquiring statuses of the printing device 4 and the like even if mounting a status monitor different from the status monitor 22. That is, the computers on the network 1 do not need to have a common status monitor.

Next, description will be given for a configuration of the printing device 4. Note that, the printing devices 5 and 6 are also examples of the image forming apparatus according to the present invention and the configuration thereof is basically the same as that of the printing device 4. The printing device 4 has a network portion (network connecting portion) 41, a system controller 42, an engine controller 43 and an engine 44.

The printing device 4 is able to communicate with the computers 2 and 3 on the network 1 through the network portion 41. The printing device 4 also receives requests from the computers 2 and 3 through the network portion 41. The system controller 42 controls an entire system of the printing device 4. The engine controller 43 controls the engine 44. The engine 44 is a part for executing printing and also includes a sensor for detecting statuses such as a status of a tray and a status of a cover (status detecting sensor).

Further, as exemplarily illustrated in FIG. 2, the printing device 4 has a CPU 45 which is independent from the system controller 42 inside the network portion 41 and has a ROM (Read Only Memory) 46 and a RAM (Random Access Memory) 47 which are available for the entire system. As exemplarily illustrated in the system controller 42 and the network portion 41 (including the CPU 45), respectively, the printing device 4 may be regarded to have an NIC (Network Interface Card) for a normal operation which is coupled with the main body of the printing device 4 and an energy-saving NIC which is independent from the main body and operates with less power.

In the normal standby status, a power is also supplied to the system controller 42 and the engine controller 43, and when a status request is received from the computer 2 or the like, the system controller 42 acquires engine information from the engine controller 43 or acquires system information which has been acquired in advance and stored in the ROM 46 or the RAM 47, and the like. The system controller 42 then returns to a request source the status information generated based on the acquired engine information or system information as a response to the status request.

The printing device 4 shifts to the energy-saving mode, for example, when a normal standby status has continued for a fixed time. In this case, the system controller 42 sends a control command to turn off the engine 44 to the engine controller 43 and then also turns off the system controller 42 excluding the network portion 41. In this way, when shifted to the energy-saving mode, in the printing device 4, supply of power to the system controller 42 and the engine controller 43 is stopped and only the network portion 41 including the CPU 45 is energized independently therefrom to be operated.

Before shifting to the energy-saving mode (power-saving status), the system controller 42 acquires from the engine controller 43 engine information including information from the status detecting sensor and stores the acquired information with its own system information and the like in the ROM 46 as for a response to a status request. Note that, description has been given assuming that the ROM 46 is a rewritable ROM such as an EEPROM (Electrically Erasable and Programmable ROM). In this way, the printing device 4 has a status information acquiring portion which acquires status information of the main body of the printing device 4 in the status where power is supplied to the main body of the printing device 4 and a status information storage portion which stores status information acquired by the status information acquiring portion.

Moreover, when the network portion 41 receives a print request from the printer driver 21 in the energy-saving mode, the CPU 45 of the network portion 41 turns on the system controller 42 and the restored system controller 42 further sends a restoration command to the engine controller 43 for restoration and executes a job processing. When a request which requires to restore power supply of the main body, not only the print request, is received from the computer 2 or the like, the CPU 45 restores the main body in the same manner.

Further, the printing device 4 has a control portion which controls supply of power to the main body of the printing device 4 in response to a status request (status inquiry) from the computer 2 and a setting portion which sets a condition for determining whether or not to supply power to the main body of the printing device 4 by the control portion. The control portion and the setting portion are able to be configured by, for example, the CPU 45 and the ROM 46, respectively.

When a status request is issued from the computer 2 while the printing device 4 is in the power-saving status, the CPU 45 makes a decision on which processing is to be executed, processing (a) or processing (b) described below, based on the condition set to the ROM 46 (by the above-described setting portion) and performs control in accordance with the decision. Here, the processing (a) is the processing for supplying power to the main body of the printing device 4 and acquiring status information to transmit it through the network portion 41. The processing (b) is the processing for, without supplying power to the main body of the printing device 4, transmitting thorough the network portion 41 status information that has been stored in the status information storage portion before the status request.

In this way, when the CPU 45 receives the status request from the computer 2 or the like in the energy-saving mode where power is cut off to the main body part including the status detecting sensor, the CPU 45 determines, based on the predetermined reference (the above-described condition) which has been set in advance, whether to respond after restoring the main body from the energy-saving mode to the normal standby mode to acquire information in the same manner as in the print request or to respond using information for a response to the status request stored before shifting to the energy-saving mode (sleep) without activating the main body. That is, the CPU 45 sorts, based on the above-described condition, whether to respond using only the network portion 41 without restoring the main body or to respond by restoring the main body.

Thereby, it is not necessary to perform restoration from the energy-saving mode whenever a status request is issued and it is possible to continue the energy-saving status for a longer time.

Figure 3:
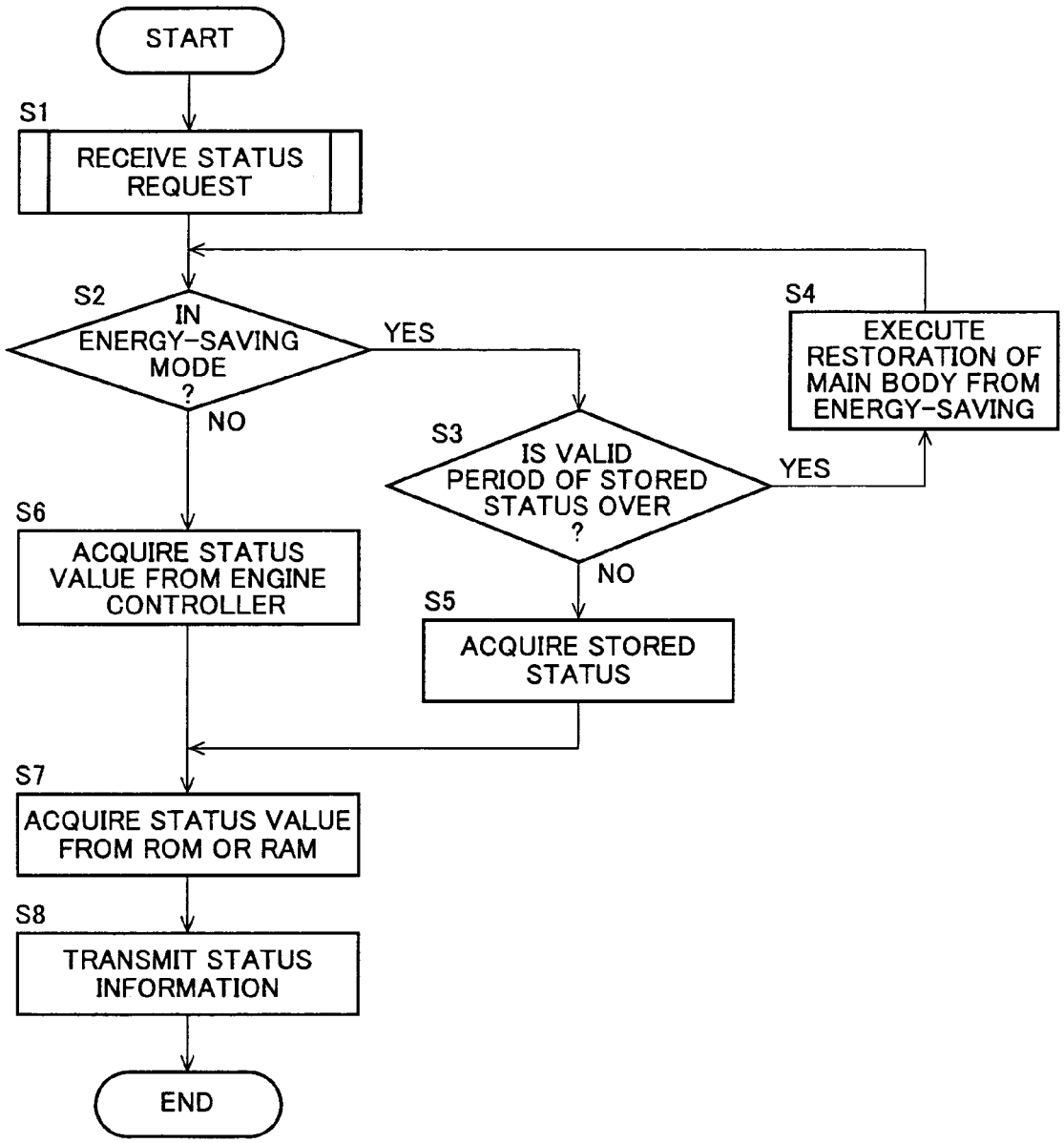
FIG. 3 is a flowchart for explaining one example of response sequences in the printing device of FIG. 2.

FIG. 3 is a flowchart for explaining one example of response sequences in the printing device of FIG. 2. The condition set by the setting portion preferably includes a valid period of status information. The status information in this case is information which is stored in the status information storage portion exemplarily illustrated in the ROM 46 and is information before the printing device 4 shifts to the energy-saving mode. The response sequence exemplarily illustrated in FIG. 3 is a sequence when the valid period is employed as the above-described condition.

First, at step S1, the CPU 45 of the network portion 41 receives a status request (status inquiry) from the computer 2 or the like. At subsequent step S2, the CPU 45 judges whether or not the system is in the energy-saving mode. If the system is not in the energy-saving mode but in the standby status where the entire system is energized (in the case of NO at step S2), the flow goes to step S6. On the other hand, in the case of the energy-saving mode (in the case of YES at step S2), the flow goes to step S3.

At step S6, current engine status information is acquired from the engine controller 43. At subsequent step S7, status information such as a setting value except engine information is acquired. At step S8, the acquired information is transmitted to a status request source. At step S3, information is not acquired from the engine controller 43 and status information which has been stored in advance is used to judge whether or not to respond without restoring the main body.

As described above, even in the energy-saving mode, the status may change even if the status detecting sensor which is turned off just has not detected. That is, the longer the lapse of time after beginning to sleep by shifting to the energy-saving mode becomes, the higher the possibility that the status information stored before the sleep separates from the actual status becomes. Accordingly, when shifting to the energy-saving mode, the printing device 4 stores the status information and the time when it stores the information as well. Then, at step S3, the CPU 45 judges whether or not the lapse of time after shifting to the energy-saving mode is beyond the valid period which has been set in advance.

When the lapse of time after shifting to the energy-saving mode is within the valid period which has been set in advance (in the case of NO at step S3), the flow goes to step S5 and the network portion 41 responds using the stored status without restoring the main body.

On the other hand, when the valid period is over (in the case of YES at step S3), the flow goes to step S4. At step S4, the network portion 41 executes restoration of the main body and then the flow goes back to the step of judging whether or not in the energy-saving mode (step S2). At step S2, by execution of restoration of the main body at step S4, the flow shifts to step S6 to acquire a status from the engine controller 43. When the main body is restored from the energy-saving mode, the stored status and the lapse of time of the energy-saving mode are reset and the information is newly set when shifting to the energy-saving mode next time.

At the process of FIG. 3, the processing (a) and the processing (b) are sorted based on whether or not the valid period of status information is over, thus making it possible to continue the energy-saving status as long as possible while considering that the longer the lapse of time after shifting to the energy-saving mode becomes, the higher the possibility of changing the status becomes, that is, reliability of the status information stored before shifting. In this way, by employing the valid period of the status information as the above-described condition, even in an environment where the computer 2 which makes a status request frequently exists, it is possible to respond with status information as new as possible to the status request while continuing the power-saving status.

Figure 4:
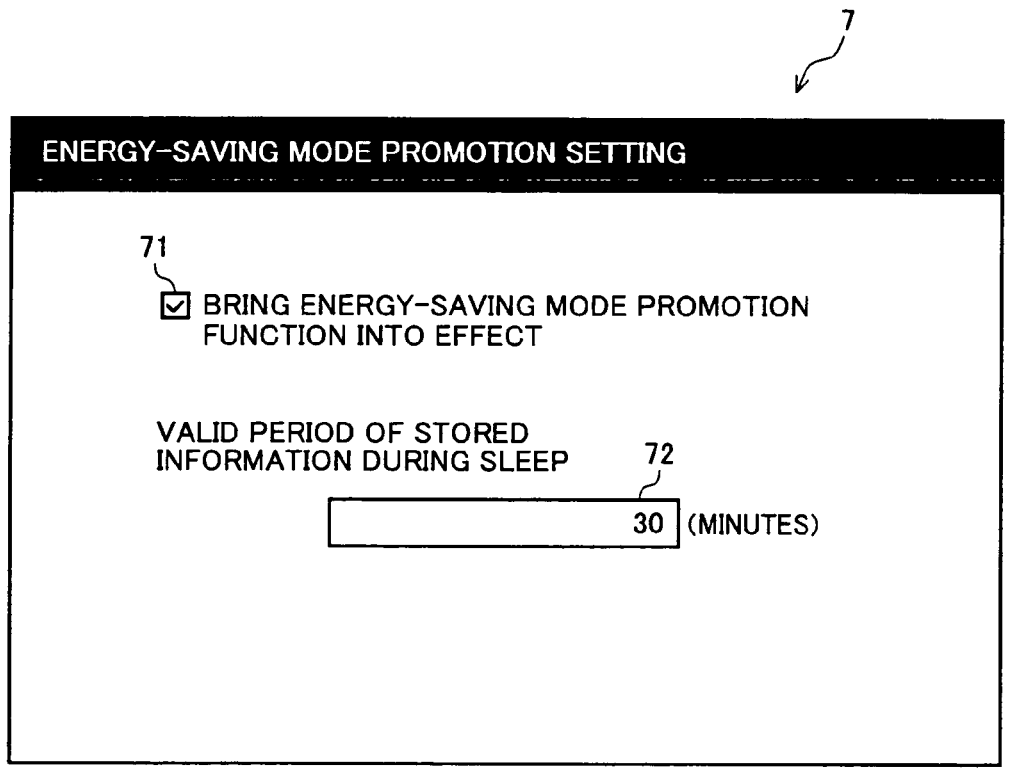
FIG. 4 is a view showing an exemplary screen for setting a status expiration period in the printing device of FIG. 2.

Moreover, the valid period of the status information may be set in advance as a default by the printing device 4 but preferably can be set by a user, and an exemplary setting screen thereof will be described with reference to FIG. 4. FIG. 4 is a view showing an exemplary screen for setting a status expiration period in the printing device of FIG. 2.

On an energy-saving mode promotion setting screen 7 exemplarily illustrated in FIG. 4, display is enabled from a main body panel (not shown) of the printing device 4, a web page and the like. On the energy-saving mode promotion setting screen 7, a setting item 71 of whether or not to bring an energy-saving mode promotion function based on the status valid period into effect and a valid period 72 in the case of bringing into effect are displayed so as to be able to be input by a user. When an input operation from the user is received, the printing device 4 stores setting information corresponding to the input operation in the ROM 46. This makes it possible to register the setting information in advance. When it is necessary to read the setting information (that is, the above-described condition), the ROM 46 may be referred to.

Figure 5:
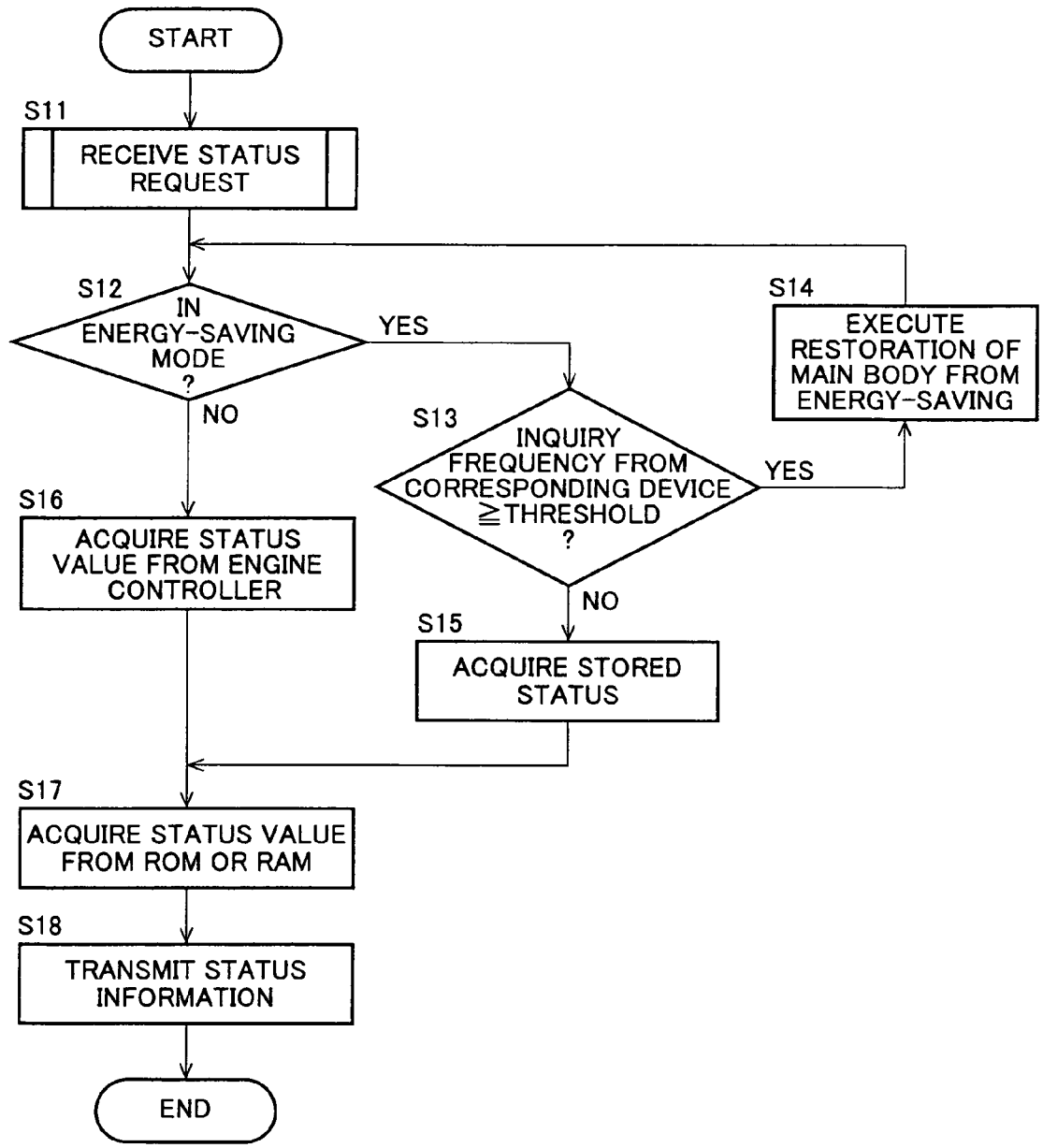
FIG. 5 is a flowchart for explaining another example of the response sequences in the printing device of FIG. 2.

FIG. 5 is a flowchart for explaining another example of the response sequences in the printing device of FIG. 2. The condition set by the setting portion preferably includes a threshold of the number of status requests (inquiries) available for each computer. Whether or not to restore the main body of the printing device 4 is determined by the threshold for each computer. The response sequence exemplary illustrated in FIG. 5 is a sequence when the threshold of the number of status requests is employed as the above-described condition. A difference from the response sequence explained in FIG. 3 is that a threshold of whether to approve or ignore a request for each computer making a status request is used as criteria for judging whether or not to restore the main body.

First, at step S11, the CPU 45 of the network portion 41 receives a status request from the computer 2 or the like. At subsequent step S12, the CPU 45 judges whether or not the system is in the energy-saving mode. If the system is not in the energy-saving mode but in the standby status where the entire system is energized (in the case of NO at step S12), the flow goes to step S16. On the other hand, in the case of the energy-saving mode (in the case of YES at step S12), the flow goes to step S13.

At step S16, current engine status information is acquired from the engine controller 43. At subsequent step S17, status information such as a setting value except engine information is acquired. At step S18, the acquired information is transmitted to a status request source. At step S13, information is not acquired from the engine controller 43 and status information which has been stored in advance is used to judge whether or not to respond without restoring the main body.

As described above, even in the energy-saving mode, the status may change even if the status sensor whose power is turned off just has not detected. That is, the longer the lapse of time after beginning to sleep by shifting to the energy-saving mode becomes, the higher the possibility that the status information stored before the sleep separates from the actual status becomes. Accordingly, it is desirable to respond by possibly acquiring an update status from the main body, which contradicts an object of power-saving. Further, the frequency of the status request from the computer 2 is different for each computer. A certain computer 2 may make a status request only just before making a print request or may inquire of a managing apparatus with a status management application very frequently.

Accordingly, in the example of FIG. 5, adjustment of the threshold of the number of status requests (inquiries) enables to inhibit release of the energy-saving status by the computer (e.g., the computer 2) which makes an inquiry frequently as described above and to respond with update status information to other computers (e.g., the computer 3).

More specifically, the printing device 4 firstly counts information of the status request frequency from the computer from one for each computer when shifting to the energy-saving mode. Then, at step S13, the threshold of the number of status requests (inquiries) of the corresponding computer which has been set in advance and what frequency of the current inquiry is (that is, a count value) are compared.

While the status request frequency is less than the predetermined threshold (in the case of NO at step S13), it is judged that it is too early to restore the main body and the flow goes to step S15 to respond using the stored status information without restoring the main body.

On the other hand, when the status request frequency is equal to or more than the threshold which has been set in advance (in the case of YES at step S13), the flow goes to step S14. At step S14, the network portion 41 executes restoration of the main body and then the flow goes back to the step of judging whether or not in the energy-saving mode (step S12). At step S12, by execution of restoration of the main body at step S14, the flow shifts to step S16 to acquire a status from the engine controller 43. With restoration of the main body from the energy-saving mode, status request frequency information from each computer is reset and counting of the information is newly started when shifting to the energy-saving mode next time.

Note that, a computer may be specified based on identification information such as a log-in user name and a computer name. Moreover, a table relating the identification information to the status request frequency may be held in the ROM 46.

At the process of FIG. 5, the processing (a) and the processing (b) are sorted based on whether or not the status request frequency for each computer is less than the threshold, thus the processing (b) enables to inhibit release of the energy-saving status with respect to the computer (e.g., the computer 2) which makes an inquiry frequently and the processing (a) enables to respond with update status information to other computers (e.g., the computer 3). That is, even if a certain specific computer makes a status request very frequently, the printing device 4 can remain in the energy-saving mode.

Figure 6:
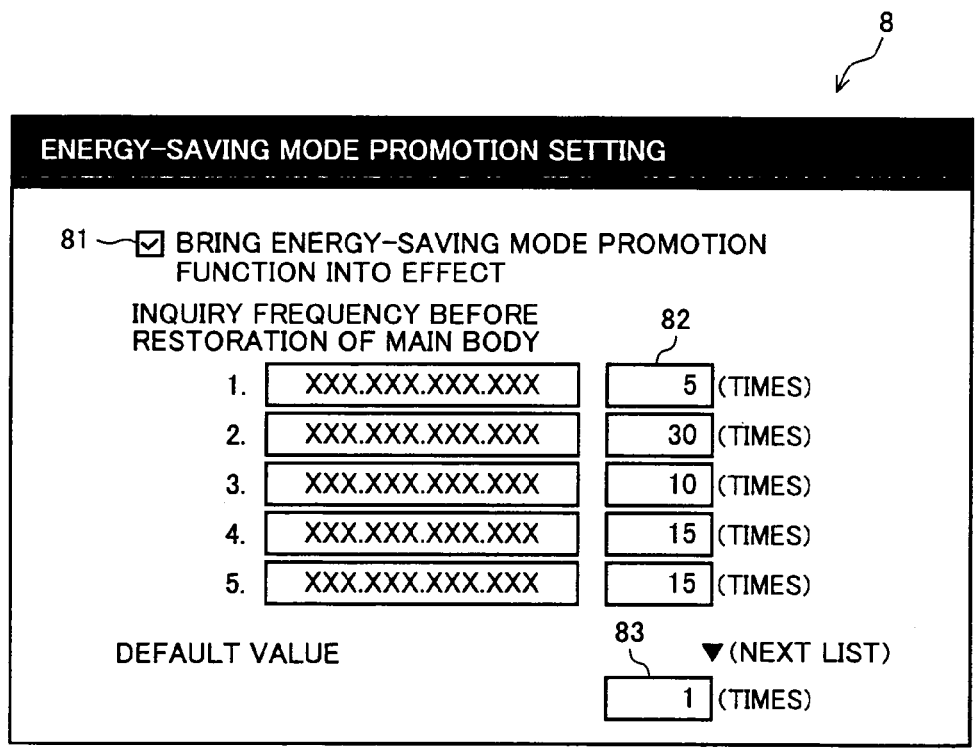
FIG. 6 is a view showing an exemplary screen for setting a threshold of the number of status requests in the printing device of FIG. 2.

Moreover, the threshold of the number of status requests may be set in advance as a default by the printing device 4 but preferably can be set by a user, and an exemplary setting screen thereof will be described with reference to FIG. 6. FIG. 6 is a view showing an exemplary screen for setting a threshold of the number of status requests in the printing device of FIG. 2.

An energy-saving mode promotion setting screen 8 exemplary illustrated in FIG. 6 can be controlled to display from a main body panel (not shown) of the printing device 4, a web page and the like. On the energy-saving mode promotion setting screen 8, a setting item 81 of whether or not to bring an energy-saving mode promotion function into effect, an inquiry frequency (statue request frequency) list 82 by execution of restoration of the main body, and a default value 83 are displayed so that a user can input. The inquiry frequency list 82 includes information for specifying individual computers such as an IP (Internet Protocol) address and a frequency of inquiry made by the computer which determines the execution of restoration of the main body. The default value 83 is used when a computer which is not included in the inquiry frequency list makes a request. When an input operation from the user is received, the printing device 4 stores setting information corresponding to the input operation in the ROM 46. This makes it possible to register the setting information in advance. When it is necessary to read the setting information (that is, the above-described condition), the ROM 46 may be referred to.

Figure 7:
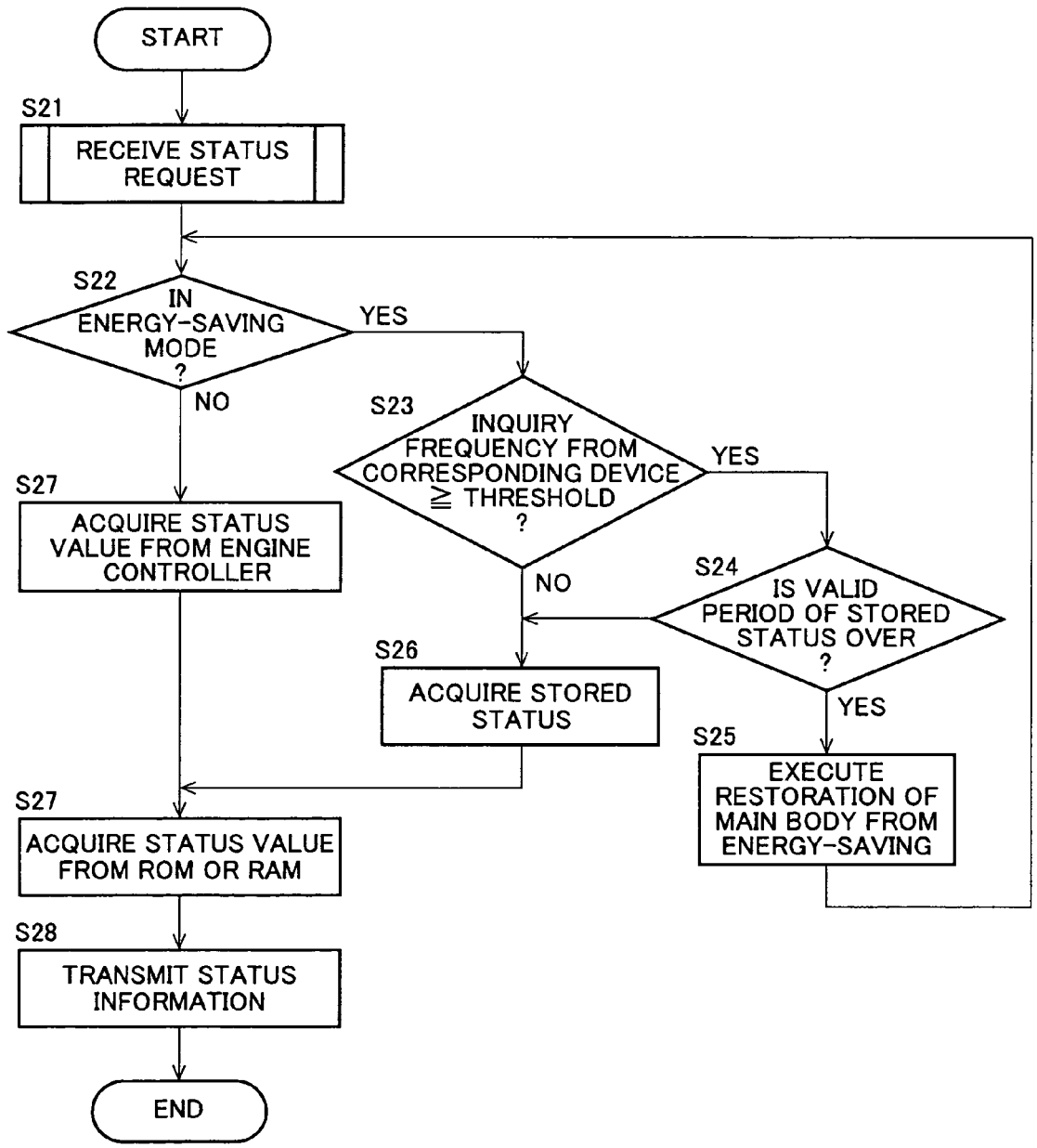
FIG. 7 is a flowchart for explaining another example of the response sequences in the printing device of FIG. 2.

FIG. 7 is a flowchart for explaining another example of the response sequences in the printing device of FIG. 2. The response sequence exemplary illustrated in FIG. 7 is a sequence when both the valid period of status information and the threshold of the number of status requests are employed as the above-described condition. That is, a difference from each of the response sequences explained in FIG. 3 and FIG. 5 is that the valid period of the stored status before shifting to the energy-saving mode and the threshold of whether to approve or ignore a request for each computer making a status request are used in combination as criteria for judging whether to restore the main body.

First, at step S21, the CPU 45 of the network portion 41 receives a status request from the computer 2 or the like. At subsequent step S22, the CPU 45 judges whether or not the system is in the energy-saving mode. If the system is not in the energy-saving mode but in the standby mode where the entire system is energized (in the case of NO at step S22), the flow goes to step S27. On the other hand, in the case of the energy-saving mode (in the case of YES at step S22), the flow goes to step S23.

At step S27, current engine status information is acquired from the engine controller 43. At subsequent step S28, status information such as a setting value except engine information is acquired. At step S29, the acquired information is transmitted to a status request source. When shifting to the energy-saving mode, the printing device 4 initializes status request frequency information from the computer 2 and counts the status request frequency for each computer while shifting to the energy-saving mode. Additionally, the status information is stored and the time when the information is stored is stored. Then, at step S23, the threshold of the number of status requests of the corresponding computer 2 which has been set in advance and what frequency of the current status request is (that is, a count value) are compared.

While the status request frequency is less than the predetermined threshold (in the case of NO at step S23), it is judged that it is too early to restore the main body and the flow goes to step S26 to respond using the stored status without restoring the main body.

On the other hand, when the status request frequency exceeds the threshold which has been set in advance (in the case of YES at step S23), the flow goes to step S24. At step S24, even though the status request frequency exceeds the threshold, it is judged whether it is necessary to restore the main body because the reliability of the stored status is low or it is not necessary to restore the main body because the reliability of the stored status is still high.

When the lapse of time after shifting to the energy-saving mode is within the valid period which has been set in advance (in the case of NO at step S24), the flow goes to step S26 and a response is made using the stored status without restoring the main body.

On the other hand, when the valid period is over (in the case of YES at step S24), the flow goes to step S25. At step S25, the network portion executes restoration of the main body and then the flow goes back to the step of judging whether or not in the energy-saving mode (step S22). At step S22, by execution of restoration of the main body at step S25, the flow shifts to step S27 to acquire a status from the engine controller 43. With restoration of the main body from the energy-saving mode, the status request frequency information from each computer is reset and counting of the information is newly started when shifting to the energy-saving mode next time. The stored status and the lapse of time of the energy-saving mode are also reset and the information is newly set when shifting to the energy-saving mode next time.

At the process of FIG. 7, the processing (a) and the processing (b) are sorted based on the valid period of the status information and the threshold of the number of status requests available for each computer, thus making it possible to keep the printing device 4 being shifted in the energy-saving mode even when a certain specific computer makes a status request very frequently, and to continue the power-saving status longer by judging whether to restore the main body while considering the reliability of the status information stored before shifting even when a status request is sent from other computers.

Figure 8:
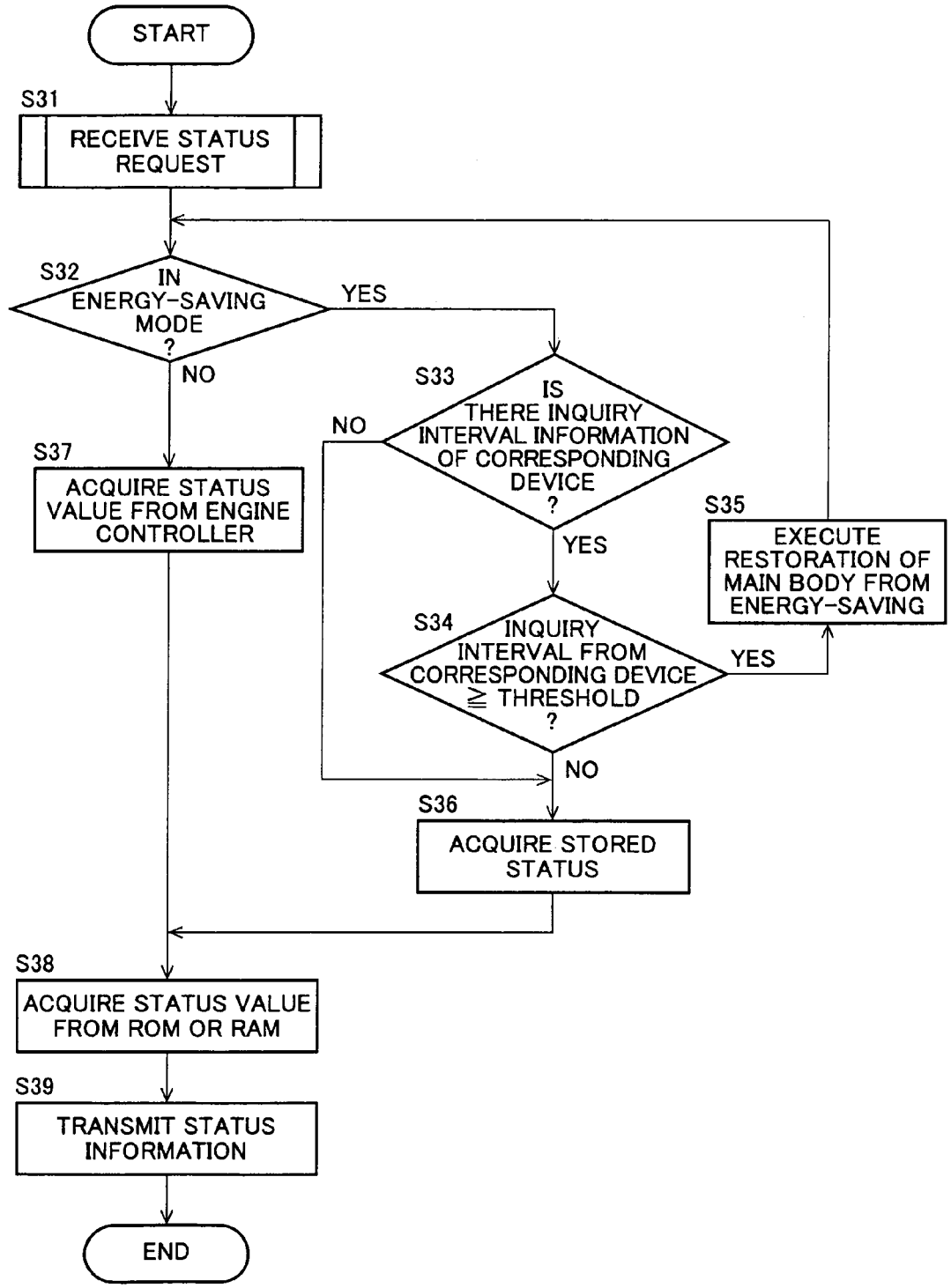
FIG. 8 is a flowchart for explaining another example of the response sequences in the printing device of FIG. 2.

FIG. 8 is a flowchart for explaining another example of the response sequences in the printing device of FIG. 2. The condition set by the setting portion preferably includes a threshold of an interval (time interval) between status requests from the same computer. The response sequence exemplarily illustrated in FIG. 8 is a sequence when the threshold of an interval between status requests (the threshold of a status request interval) is employed as the above-described condition. That is, a difference from each of the response sequences explained in FIG. 3, FIG. 5 and FIG. 7 is that the status request interval (inquiry interval) of a computer making a status request is used as criteria for judging whether to restore the main body.

First, at step S31, the CPU 45 of the network portion 41 receives a status request from the computer 2 or the like. At subsequent step S32, the CPU 45 judges whether or not the system is in the energy-saving mode. If the system is not in the energy-saving mode but in the standby status where the entire system is energized (in the case of NO at step S32), the flow goes to step S37. On the other hand, in the case of the energy-saving mode (in the case of YES at step S32), the flow goes to step S33.

At step S37, current engine status information is acquired from the engine controller 43. At subsequent step S38, status information such as a setting value except engine information is acquired. At step S39, the acquired information is transmitted to a status request source.

At step S33 and step S34, status information which has been stored in advance is used to judge whether to respond without restoring the main body. First, the printing device 4 stores an inquiry time interval (status request interval) from a computer for each computer when shifting to the energy-saving mode. Then, at step S33, whether or not there is status request interval information of the corresponding device is judged. Note that, a computer which makes the status request may be specified based on identification information such as a log-in user name and a computer name, and the identification information may be held in the ROM 46 or the RAM 47 until the threshold is exceeded.

Since the status request interval is able to be calculated in the case where an inquiry has been made from a device two times or more, when the inquiry from the corresponding device is made for the first time after shifting to the energy-saving mode (in the case of NO at step S33), there is no status request interval information and, therefore, the flow goes to step S36 to respond using the stored status without restoring the main body.

On the other hand, when there is status request interval information (in the case of YES at step S33), the flow goes to step S34. At step S34, the threshold of the status request interval which has been set in advance and the status request interval from the corresponding device are compared.

When the current status request interval is smaller than the predetermined threshold (in the case of NO at step S34), the flow goes to step S36 to respond using the stored status without restoring the main body.

On the other hand, when the current status request interval is equal to or more than the threshold which has been set in advance (in the case of YES at step S34), the flow goes to step S35. At step S35, the network portion 41 executes restoration of the main body and then the flow goes back to the step of judging whether or not in the energy-saving mode (step S32). At step S32, by execution of restoration of the main body at step S35, the flow shifts to step S37 to acquire a status from the engine controller 43. With restoration of the main body from the energy-saving mode, the status request interval information from each computer is reset and the information is newly recorded when shifting to the energy-saving mode next time.

At the process of FIG. 8, the processing (a) and the processing (b) are sorted based on whether or not the status request interval from the same computer is equal to or more than the threshold, and when the status request is sent in such a short time interval that hinders continuation of the energy-saving mode, performing the processing (b) enables to respond with the energy-saving mode continued. In addition, there may be abnormity of a request source of the status request or an access by a malicious person and the processing (b) is efficient for such a status request.

Figure 9:
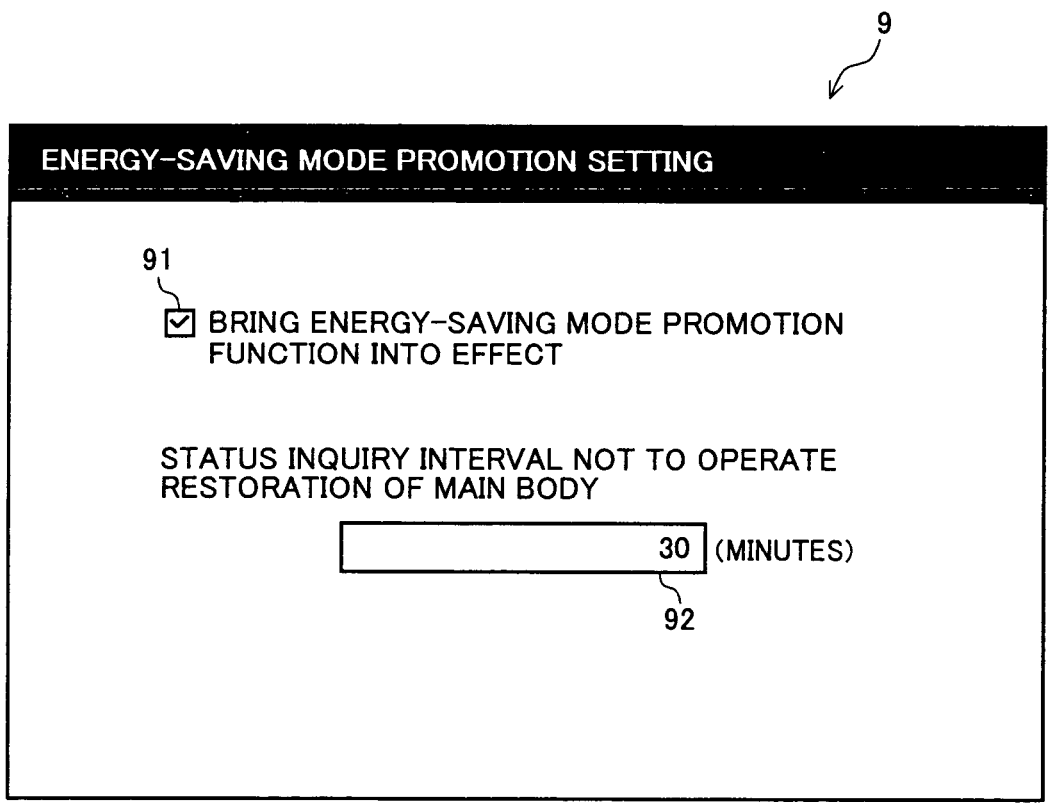
FIG. 9 is a view showing an exemplary screen for setting a threshold of an interval between status requests in the printing device of FIG. 2.

Moreover, the threshold of the status request interval may be set in advance as a default by the printing device 4 but preferably can be set by a user, and an exemplary setting screen thereof will be described with reference to FIG. 9. FIG. 9 is a view showing an exemplary screen for setting a threshold of an interval between status requests in the printing device of FIG. 2.

An energy-saving mode promotion setting screen 9 exemplary illustrated in FIG. 9 can be controlled to display from a main body panel (not shown) of the printing device 4, a web page and the like. On the energy-saving mode promotion setting screen 9, a setting item 91 of whether or not to bring an energy-saving mode promotion function into effect and an inquiry interval (status request interval) 92 by execution of restoration of the main body are displayed so that a user can input. When an input operation from the user is received, the printing device 4 stores setting information corresponding to the input operation in the ROM 46. This makes it possible to register the setting information in advance. When it is necessary to read the setting information (that is, the above-described condition), the ROM 46 may be referred to.

A control based on the status request interval and a setting of the threshold of the status request interval explained with reference to FIG. 8 and FIG. 9 are applicable simultaneously with the examples explained with reference to FIGS. 3 to 7.

According to the image forming apparatus of the present invention, when the network connecting portion receives a status request from the external apparatus in a power-saving status where supply of power is stopped to the main body part including the status detecting sensor, it is possible to sort whether to respond only by the network connecting portion without restoring the main body or to respond by restoring the main body.

Moreover, according to the image forming apparatus of another embodiment of the present invention, even in an environment where an external apparatus which makes a status request frequently exists, it is possible to respond with status information as new as possible to the status request while continuing a power-saving status.

The invention claimed is:

1. An image forming apparatus having a network connecting portion and capable of communicating with an external apparatus through the network connecting portion, comprising:
    a control portion for controlling supply of power to a main body of the image forming apparatus in response to a status request from the external apparatus;
    a setting portion for setting a condition for determining whether or not to perform supply of power to the main body of the image forming apparatus by the control portion;
    a status information acquiring portion for acquiring status information of the main body of the image forming apparatus in the status where supply of power is performed to the main body of the image forming apparatus; and
    a status information storage portion for storing status information acquired by the status information acquiring portion, wherein
    when the status request is sent from the external apparatus while the image forming apparatus is in a power-saving status, based on the condition set by the setting portion, the control portion makes a determination of whether (a) to perform supply of power to the main body of the image forming apparatus and acquire the status information to transmit it through the network connecting portion or (b) not to perform supply of power to the main body of the image forming apparatus, but to transmit through the network connecting portion the status information that has been stored in the status information storage portion before the status request, and performs controls based on the determination.

2. The image forming apparatus as defined in claim 1, wherein
    the condition set by the setting portion includes a valid period of the status information, stored in the status information storage portion, of the main body of the image forming apparatus which is before it has come into the power-saving status.

3. The image forming apparatus as defined in claim 1, wherein
    the condition set by the setting portion includes a threshold of the number of status requests available for each external apparatus.

4. The image forming apparatus as defined in claim 1, wherein
    the condition set by the setting portion includes a threshold of an interval between status requests from the same external apparatus.

* * * * *